(12) United States Patent
Hertweck et al.

(10) Patent No.: US 7,637,106 B2
(45) Date of Patent: Dec. 29, 2009

(54) EXHAUST-GAS TURBOCHARGER FOR AN INTERNAL COMBUSTION ENGINE

(75) Inventors: Gernot Hertweck, Fellbach (DE); Torsten Hirth, Rutesheim (DE); Stephan Krätschmer, Schwäbisch Gmünd (DE); Paul Löffler, Stuttgart (DE); Siegfried Sumser, Stuttgart (DE)

(73) Assignee: Daimler AG, Stuttgart (DE)

( * ) Notice: Subject to any disclaimer, the term of this patent is extended or adjusted under 35 U.S.C. 154(b) by 329 days.

(21) Appl. No.: 11/804,330

(22) Filed: May 17, 2007

(65) Prior Publication Data

US 2008/0000460 A1    Jan. 3, 2008

Related U.S. Application Data

(63) Continuation-in-part of application No. PCT/EP2005/011928, filed on Nov. 8, 2005.

(30) Foreign Application Priority Data

Nov. 18, 2004    (DE) .................. 10 2004 055 571

(51) Int. Cl.
| | |
|---|---|
| F02D 23/00 | (2006.01) |
| F02B 37/18 | (2006.01) |
| F02B 37/22 | (2006.01) |
| F02B 37/00 | (2006.01) |
| F16K 11/085 | (2006.01) |
| F02C 6/12 | (2006.01) |

(52) U.S. Cl. ................. 60/602; 137/625.47

(58) Field of Classification Search ............ 60/602; 137/625.47; F02B 37/18, 37/22, 37/00; F16K 11/68; F02C 6/12

See application file for complete search history.

(56) References Cited

U.S. PATENT DOCUMENTS

| 4,165,763 A | * | 8/1979 | Hough ............... 137/625.47 |
|---|---|---|---|
| 4,355,659 A | * | 10/1982 | Kelchner ............ 137/625.47 |
| 4,443,153 A | * | 4/1984 | Dibelius ................. 60/602 |
| 4,526,004 A | | 7/1985 | French et al. ............ 60/602 |
| 5,893,392 A | * | 4/1999 | Spies et al. ........... 137/625.47 |
| 6,401,754 B1 | * | 6/2002 | Winquist et al. ....... 137/625.47 |
| 6,941,755 B2 | * | 9/2005 | Bucknell et al. ........... 60/602 |
| 7,051,527 B2 | * | 5/2006 | Schmid et al. ............ 60/602 |
| 7,428,813 B2 | * | 9/2008 | Finger et al. ............ 60/602 |

FOREIGN PATENT DOCUMENTS

| DE | 1 804 606 | 2/1970 |
|---|---|---|
| DE | 25 06 941 | 9/1976 |
| DE | 196 18 160 | 11/1997 |

(Continued)

Primary Examiner—Thai Ba Trieu
(74) Attorney, Agent, or Firm—Klaus J. Bach

(57) ABSTRACT

In an exhaust gas turbocharger for an internal combustion engine having air intake ducts and exhaust gas discharge ducts including a compressor and a turbine with at least two inlet flow passages, a flow adjusting device (15) arranged in the exhaust gas discharge ducts upstream of the turbine and including a rotary slide valve for controlling the exhaust gas flow first and second flow channels extending through the rotary slide, a third flow channel extends axially partially through the rotary slide valve via inlet openings at the circumference of the rotary slide which can be brought into overlapping relationship with rotary slide housing openings for controlling the exhaust gas flow from the engine to the turbine.

6 Claims, 5 Drawing Sheets

FOREIGN PATENT DOCUMENTS

| | | |
|---|---|---|
| DE | 197 09 879 | 9/1998 |
| DE | 198 36 677 | 2/2000 |
| DE | 101 32 672 | 1/2003 |
| DE | 102 22 917 | 12/2003 |
| DE | 102 58 022 | 6/2004 |
| DE | 103 03 777 | 8/2004 |
| FR | 2 482 238 | 11/1981 |
| GB | 2 340 545 | 2/2005 |
| JP | 58172427 A * | 10/1983 |
| JP | 63 272910 | 11/1988 |
| WO | WO 03/044327 | 5/2003 |
| WO | WO 2004/053310 | 6/2004 |

* cited by examiner

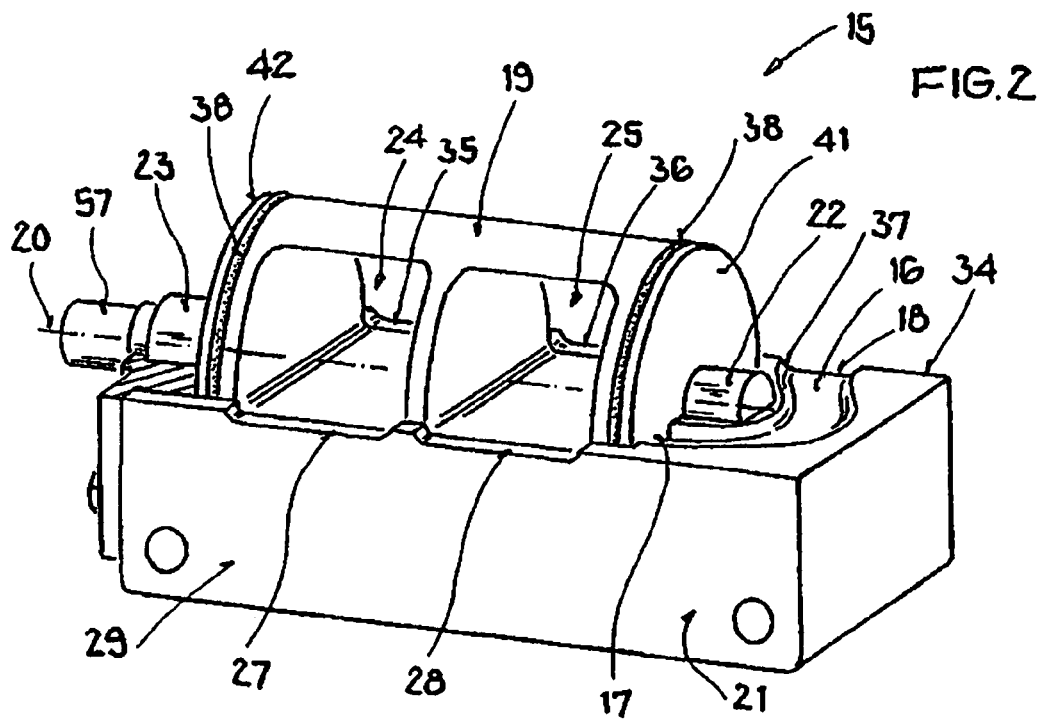
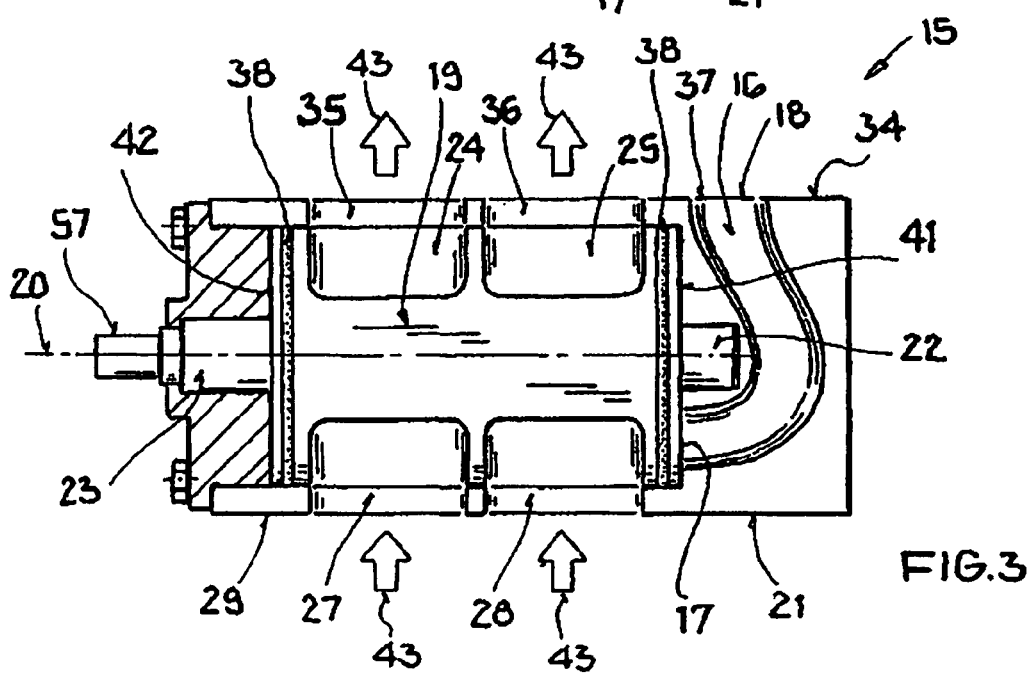

EXHAUST-GAS TURBOCHARGER FOR AN INTERNAL COMBUSTION ENGINE

This is a Continuation-In-Part Application of pending International Patent Application PCT/EP2005/011928 filed Nov. 8, 2005 and claiming the priority of German patent application 10 2004 055 571.0 filed Nov. 18, 2004.

BACKGROUND OF THE INVENTION

The invention relates to an exhaust-gas turbocharger for an internal combustion engine including a compressor disposed in an engine intake section and or turbine disposed in an engine exhaust section and having a plurality of exhaust gas inlet flows and a turbine bypass line and a rotary slide valve for controlling the exhaust gas flows through and past the turbine.

DE 196 18 160 C2 discloses an exhaust-gas turbocharger for an internal combustion engine, the turbine of which has a rotor and a turbine housing having at least two inlet flow passages which are separated by a separating wall, and a bypass branching off from at least one flow passage. Exhaust gas can be conducted away from at least one flow passage via this bypass. The bypass is configured in such a way that a section of the bypass is formed by the separating wall of the flows passages, this section having openings, in order to provide for, or to block, a flow connection from the bypass to at least one of the flow passages. A bypass valve is arranged in the section of the bypass which is formed by the separating wall. This bypass valve is provided with flow channels. The flow connection can then be produced via the bypass valve between one of the two flow passages or both flow passages at the same time and the bypass, in such a way that the flow channels in the valve are situated in partial or in complete congruence with the openings of the section in the separating wall of the bypass. That section of the separating wall which forms the bypass is configured as a cylindrical sleeve having the abovementioned openings, and the valve is configured as a rotary slide which is arranged in the cylindrical sleeve and has the abovementioned flow channels. The exhaust gas supply to the turbine can be metered accurately via the valve. The abovementioned openings are groove-shaped recesses in the wall of the rotary slide and not through-flow openings. The intention is to ensure the high mechanical requirements of the optional turbo-brake system (called turbo-brake) which has been put into series production in the meantime. One of the basic elements of the turbo-brake of a turbine having two or more flow passages is a turbo-brake radial flow guide structure which can be displaced axially directly in front of the turbine wheel and a two-flow blow-off device for diverting exhaust gas from the flow ducts or passages to the turbine. The turbo-brake radial flow guide structures are filigree precision casting die parts which are more expensive the higher the mechanical and thermal requirements are on account of high exhaust gas mass flows.

It is the object of the present invention to provide an exhaust-gas turbocharger for an internal combustion engine, which exhaust-gas turbocharger satisfies the mechanical and thermal requirements of modern turbo-brake systems.

SUMMARY OF THE INVENTION

In a supercharged internal combustion engine having a plurality of cylinders which are arranged in at least one cylinder bank of a V-type engine with an exhaust gas turbocharger including a compressor, which is arranged in an intake line of the internal combustion engine, and having a turbine which is arranged in an exhaust gas collection line, the exhaust gas of a plurality of cylinders of the cylinder bank being combined in the exhaust gas collection line, while at least one cylinder of a cylinder bank has a separate exhaust gas line which bypasses the exhaust gas turbocharger and joins the gas collection line downstream of the turbine.

The exhaust-gas turbocharger according to the invention, is equipped with a flow adjusting device comprising a rotary slide valve disposed in a rotary slide valve housing with a first and a second rotary slide valve housing opening, and a bypass with a bypass inlet and a bypass outlet, a first and a second flow channel of the rotary slide valve penetrating the rotary slide transversely with respect to its rotational axis. A third flow channel extends partially through the rotary slide in the direction of the rotational axis and has at least two inlet openings on the housing side and at least one outlet opening at the axial end face thereof. The inlet openings can be brought into congruence with the first and the second rotary slide housing openings. The rotary slide housing has two radial rotary slide housing openings at the side thereof which faces away from the turbine wheel, that is, a first and a second rotary slide housing opening, and three rotary slide housing openings at the side thereof which faces the turbine wheel, that is, a third, a fourth and a fifth rotary slide housing opening. When the bypass is closed, the first and the second rotary slide housing openings and the third and the fourth rotary slide housing openings correspond with the first and the second flow channels of the rotary slide, respectively. When the bypass is open, the first and the second rotary slide housing openings coincide with the inlet openings which are arranged at the end face of the rotary slide, and the outlet opening of the third flow channel of the rotary slide corresponds with the bypass inlet. As a result of the above-described arrangement, all of the exhaust gas can flow into the turbine wheel while swirl the swirl and flow speed are increased during an engine braking mode, as the flow is directed through the guide vane structure in the form of discrete flows. The mechanical and thermal requirements of the precision casting guide vane grid are lowered by the flow reduction ahead of the precision casting grid. The arrangement of the channels of the rotary slide permits mechanical, reliable blocking and opening of the channels and, moreover, leads to a compact overall design.

In one advantageous embodiment of the invention, the first and the second flow channels of the rotary slide penetrate the rotary slide perpendicularly with respect to its rotational axis. As a result of this arrangement of the channels, the channel length is shortened to its minimum and the flow loss correction values which are associated with the flow are reduced.

In a refinement of the invention, the rotary slide has sealing rings and at least one sealing strip for flow guidance with virtually no losses.

In a further advantageous refinement, the bypass opens downstream of the rotary slide into one of the flow passage of the turbine, as a result of which a flow diversion of the exhaust gas from one flow passage to another flow passage can be obtained.

Preferably, the first flow channel and the second flow channel are arranged next to one another and parallel to one another, with the result that flow loss correction values of the flow in the flow channels are virtually identical.

In still a further advantageous refinement, the third flow channel is arranged transversely, in particularly perpendicularly with respect to the first and the second flow channels, there being a continuous wall of the rotary slide between the first or the second flow channel and the third flow channel. As a result of this arrangement, it is possible to direct the flow from at least two exhaust gas lines into a single flow channel, in a compact and reliable design.

The invention will become more readily apparent from the following description of a particular embodiment thereof with reference to the accompanying:

BRIEF DESCRIPTION OF THE DRAWINGS

FIG. 2 is a perspective view of a flow adjusting device of the exhaust-gas turbocharger according to the invention, including a rotary slide in a rotary slide valve housing in a position, in which a by pass flow is blocked, FIG. 3 is a plan view of the flow adjusting device which is shown in FIG. 2 for the exhaust-gas turbocharger according to the invention.

DESCRIPTION OF A PARTICULAR EMBODIMENT

In the figures, identical or identically acting components are provided with identical designations.

Figure 1:
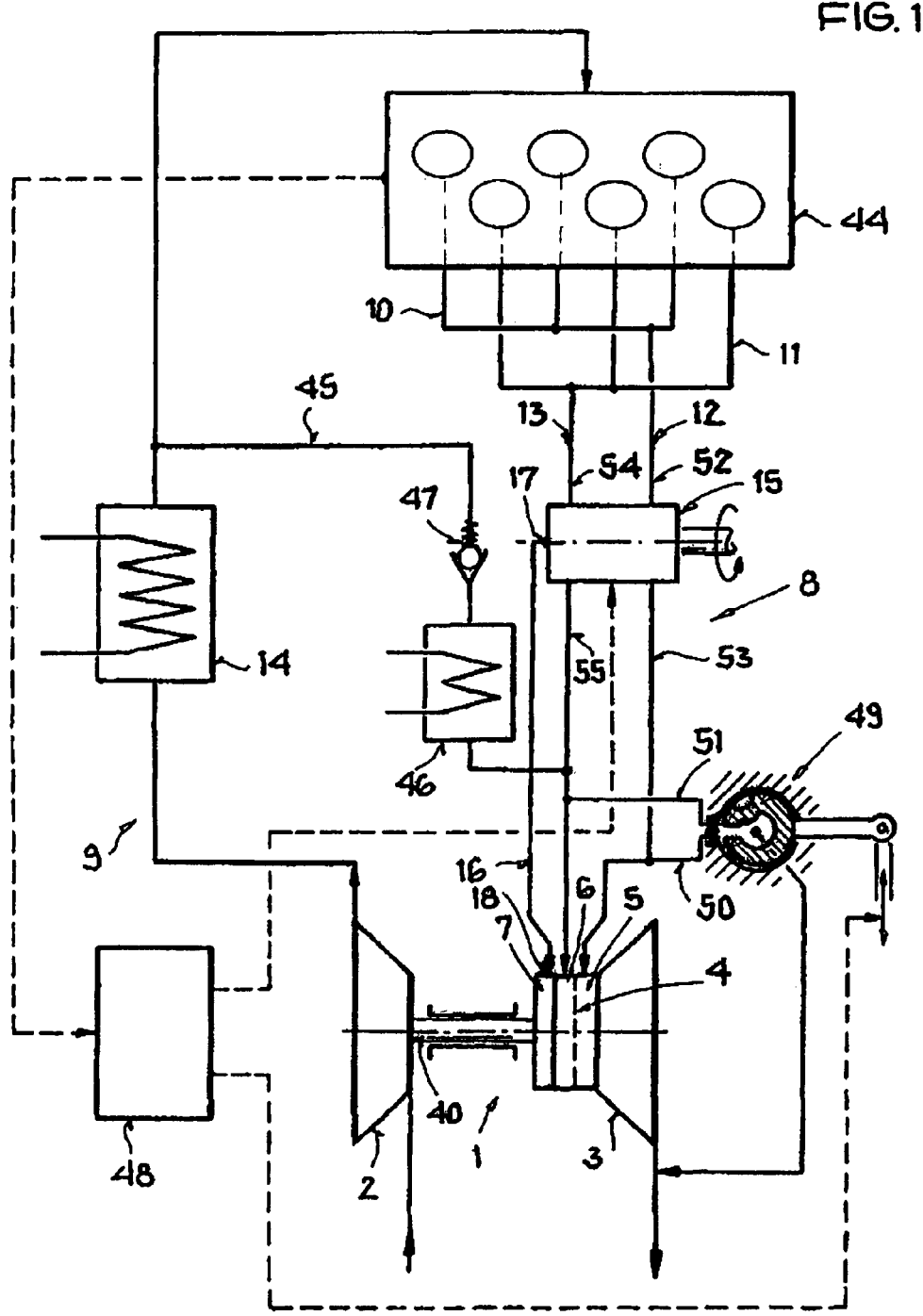
FIG. 1 shows a diagrammatic illustration of an internal combustion engine having an exhaust-gas turbocharger according to the invention.

FIG. 1 shows an internal combustion engine 44, a diesel engine or a spark ignition engine, for a motor vehicle, which internal combustion engine 44 has an exhaust gas section 8 and an intake section 9. The internal combustion engine 44 includes an exhaust-gas turbocharger 1. The exhaust-gas turbocharger 1 comprises a compressor 2 which is connected fixedly in terms of rotation to a turbine 3 via a shaft 40. The turbine 3 is driven by the exhaust gas of the internal combustion engine 44 and drives the compressor 2 via the shaft 40 with the result that combustion air can be sucked in and compressed by the compressor 2. The turbine 3 has a turbine wheel 4 and three flow passages, a first flow passage 5, a second flow passage 6 and a third flow passage 7. A charge air cooler 14 for cooling the compressed combustion air is accommodated in the intake section 9 of the internal combustion engine 44 downstream of the compressor 2.

The compressed and cooled combustion air leaves the intake section 9 via intake channels (not shown in greater detail) and inlet valves of the internal combustion engine 44 and enters the combustion chambers (not shown in greater detail) of the cylinders (not shown in greater detail) of the internal combustion engine 44. In the combustion chambers of the internal combustion engine 44, the combustion air is burnt with a supply of fuel and flows in the form of exhaust gas via outlet valves (not shown in greater detail) and outlet channels of the internal combustion engine 44 into two exhaust gas manifolds which are arranged downstream of the internal combustion engine 44, a first and a second exhaust gas manifold 10, 11. The exhaust gas section 8 has a first exhaust gas line 12 and a second exhaust gas line 13. The first exhaust gas line 12 represents the connection of the first exhaust gas manifold 10 to the first flow 5 of the turbine 3. The second exhaust gas line 13 connects the second exhaust gas manifold 11 to the second flow 6 of the turbine 3. The exhaust gas therefore flows out of the exhaust gas manifolds 10, 11 via the exhaust gas lines 12, 13 into the flow passages 5, 6 of the turbine 3.

A slide valve 49 is provided upstream of the turbine 3, which slide valve 49 is connected via a first slide channel 50 to the first exhaust gas line 12 which opens into the first flow passage 5 and via a second slide channel 51 to the second exhaust gas line 13 which opens into the second flow passage 6, upstream of the turbine 3. An exhaust gas recirculation line 45 having an exhaust gas recirculation cooler 46 and an exhaust gas recirculation valve 47 branches off from the second exhaust gas line 13 in the exhaust gas section 8 of the internal combustion engine 44 upstream of the slide valve 49. The exhaust gas recirculation line 45 opens into the intake section 9 downstream of the charge air cooler 14.

A flow adjusting device 15 is provided in the exhaust gas section 8 downstream of the exhaust gas manifolds 10, 11 and upstream of the branch for the exhaust gas recirculation line 45. The flow adjusting device 15 divides the exhaust gas lines 11 and 12 into a total of four parts, a first exhaust gas line part 52, a second exhaust gas line part 53, a third exhaust gas line part 54 and a fourth exhaust gas line part 55. The first exhaust gas line part 52 and the second exhaust gas line part 53 form the first exhaust gas line 12, the first exhaust gas line part 52 being arranged upstream of the flow adjusting device 15 and the second exhaust gas line part 53 being arranged downstream of the flow adjusting device 15. The third exhaust gas line part 54 and the fourth exhaust-gas line part 55 form the second exhaust gas line 13, the third exhaust gas line part 54 being arranged upstream of the flow adjusting device 15 and the fourth exhaust gas line part 55 being arranged downstream of the flow adjusting device 15. A bypass 16 which establishes a connection of the flow adjusting device 15 to the third flow passage 7 of the turbine 3 branches off from the flow adjusting device 15.

In addition to the shown arrangement of the flow adjusting device 15 upstream of the branch for the exhaust gas recirculation line 45, the flow adjusting device 15 could be arranged, for example, downstream of the branch of the exhaust gas recirculation line 45. An arrangement of the flow adjusting device 15 downstream of the slide device 49 is not expedient, as the flow adjusting device 15 is intended to be used to assist the slide device 49.

The internal combustion engine 44, the slide device 49 and the flow adjusting device 15 are electrically connected to a control unit 48 of the internal combustion engine 44, for the control of the slide device 49 and the flow adjusting device 15 to be operated as a function of thermodynamic state variables of the internal combustion engine 44.

Figure 6:
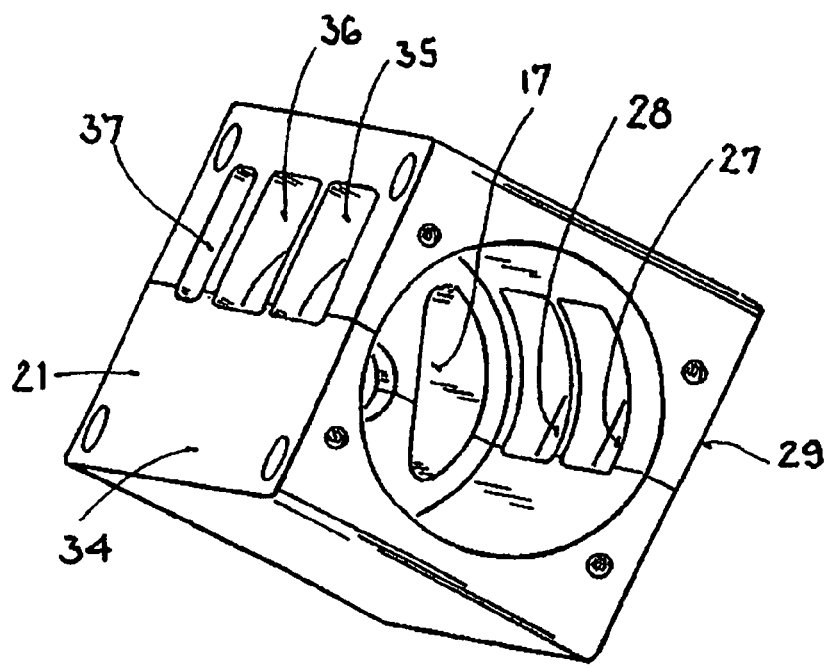
FIG. 6 is a perspective illustration of the rotary slide valve housing of the flow adjusting device for the exhaust-gas turbocharger according to the invention.

FIG. 2 shows the flow adjusting device 15 having a rotary slide 19, with its rotational axis 20 and a rotary slide housing 21. The rotary slide 19 has two flow channels, a first flow channel 24 and a second flow channel 25, in that region of the rotary slide 19 which is shown in FIG. 2. In this figure, the rotary slide housing 21 is shown in section along the rotational axis 20 of the rotary slide 19, with the result that only part of the rotary slide housing 21 is visible. For improved comprehension, FIG. 6 shows the rotary slide housing 21 in a perspective view without the rotary slide.

Figure 9:
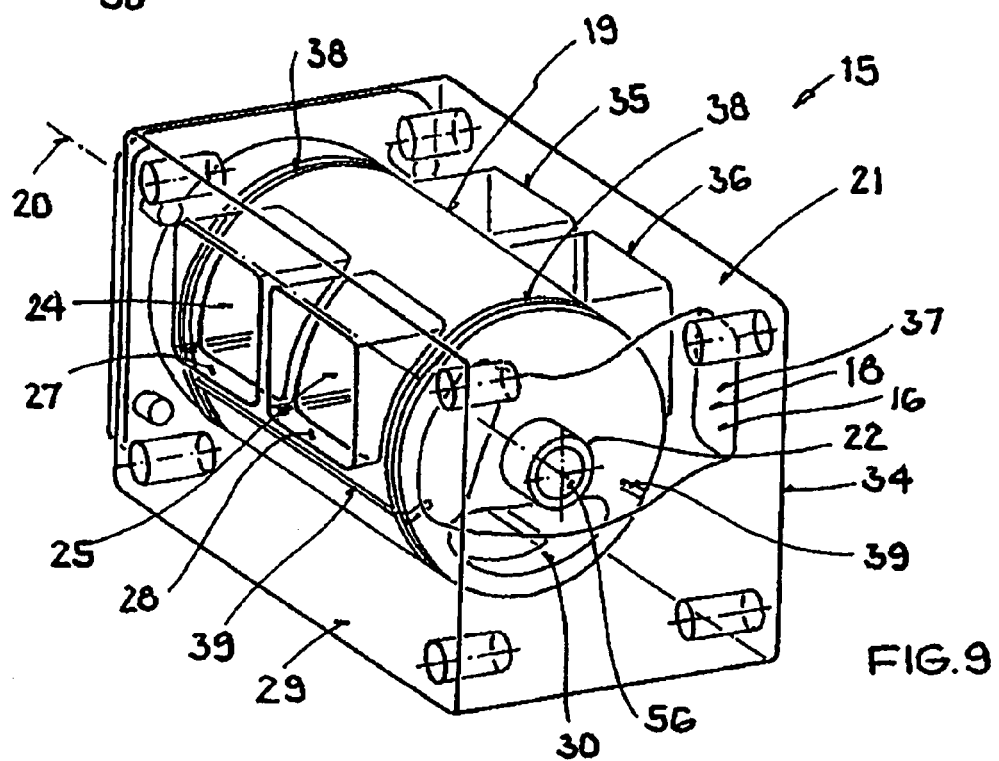
FIG. 9 is a perspective assembled illustration of the flow adjusting device for the exhaust-gas turbocharger according to the invention.

FIG. 3 shows the plan view of the flow adjusting device 15 which is shown in FIG. 2. The arrows 43 show the flow direction of the exhaust gas from the internal combustion engine 44 to the turbine 3 or to the turbine wheel 4, with which a side 29 which faces away from the turbine wheel and a side 34 which faces the turbine wheel can be defined on the rotary slide housing 21. On the side 29 which faces away from the turbine wheel, the rotary slide housing 21 has two rotary slide housing openings, a first rotary slide housing opening 27 and a second rotary slide housing opening 28. On that side 34 of the rotary slide housing 21 which faces the turbine wheel, three further rotary slide housing openings are provided, a third rotary slide housing opening 35, a fourth rotary slide housing opening 36 and a fifth rotary slide housing opening 37. For improved comprehension of the rotary slide housing 21 in the assembled state with the rotary slide 19, FIG. 9 shows a perspective assembled illustration of the flow adjusting device 15. The rotary slide housing 21 is shown in such a way that the rotary slide housing openings 27, 28, 35, 36 and 37 and the bypass 16 and its extent in the rotary slide housing 21 are satisfactorily visible.

The rotary slide 19 has two end sides, a first end side 41 and a second end side 42. As viewed in the direction of the arrows 43, the first end side 41 is situated, in FIG. 3, on the right-hand side of the rotary slide 19 in the interior of the rotary slide housing, and the second end side 42 is situated on the left-hand side of the rotary slide 19, likewise within the rotary slide housing 21.

In addition to the rotary slide housing openings 27, 28, 35, 36 and 37, the rotary slide housing 21 has the bypass 16 with a bypass inlet 17 and a bypass outlet 18, the fifth rotary slide housing opening 37 on that side 34 of the rotary slide housing 21 which faces the turbine wheel representing the bypass outlet 18 of the bypass 16. It is also possible, in addition to the bypass 16 being incorporated as shown into the rotary slide housing 21, to integrate the bypass 16 into the rotary slide 19. The bypass outlet 18 would then correspond with the rotary slide housing opening 37. In this case, where the bypass 16 is integrated into the rotary slide 19, the rotary slide 19 would then be of somewhat longer configuration and the bypass inlet 17 would serve as an outlet opening of a third flow channel 30 which is shown in FIG. 4.

That position of the flow adjusting device 15 which is shown in FIG. 2 and FIG. 3 with a blocked bypass 16 corresponds to a closed position. The first and the second flow channels 24 and 25 open the rotary slide housing openings 27, 28, 35 and 36, with the result that the exhaust gas can flow, without a change in its flow direction, from the first exhaust gas line part 52 into the second exhaust gas line part 53 or from the third exhaust gas line part 54 into the fourth exhaust gas line part 55. Here, the end face 41 of the rotary slide 19 blocks the bypass inlet 17 or the bypass 16.

Figure 4:
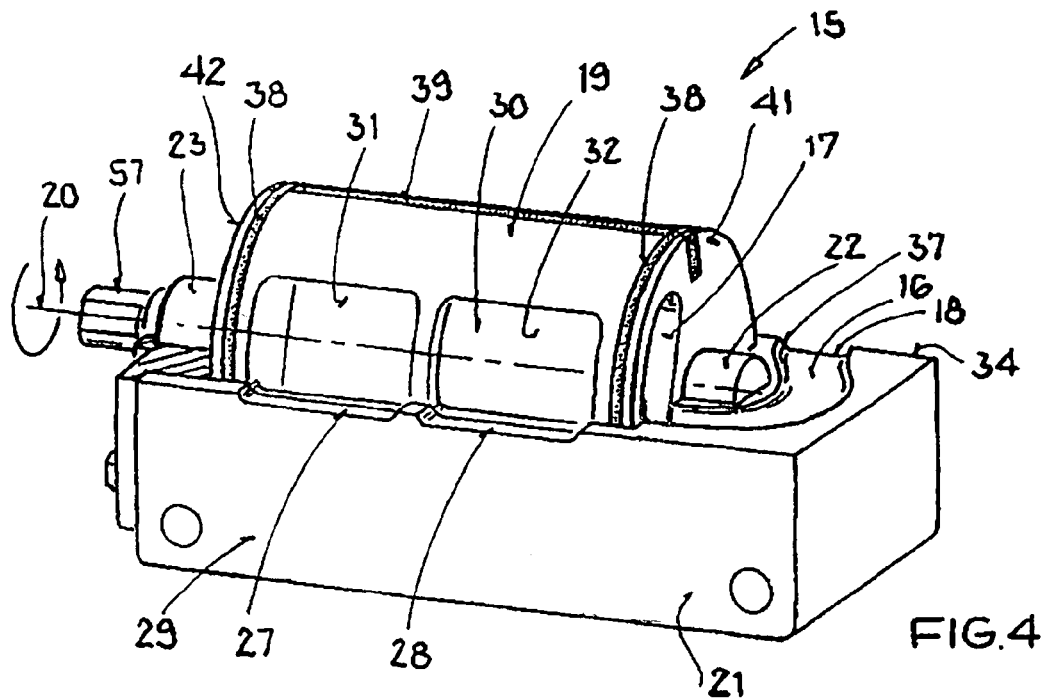
FIG. 4 is a perspective view of the flow adjusting device for the exhaust-gas turbocharger according to the invention, having the rotary slide in the rotary slide valve housing shown in a position, in which the bypass is open.
Figure 5:
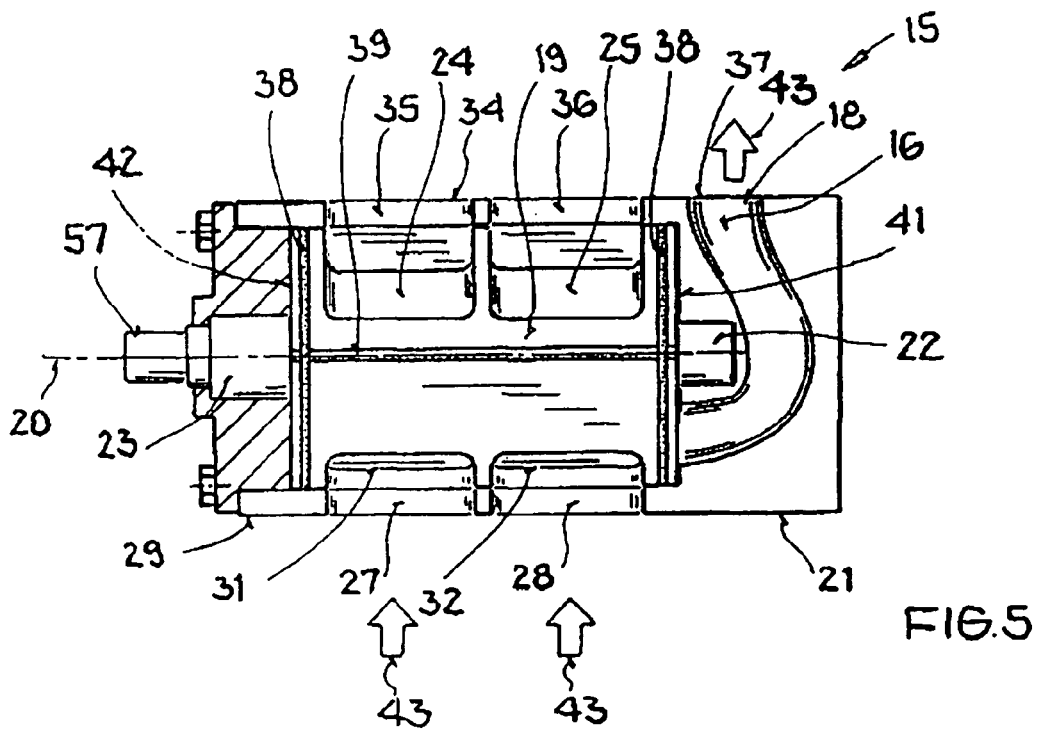
FIG. 5 is a plan view of the flow adjusting device which is shown in FIG. 4 for the exhaust-gas turbocharger according to the invention.

FIG. 4 shows the flow adjusting device 15 in a position in which the bypass 16 is open. The rotary slide 19 includes the third flow channel 30 which extends only partially through the rotary slide 19 and parallel to the rotational axis 20 of the rotary slide 19. The third flow channel 30 has two inlet openings on the casing side, a first inlet opening 31 and a second inlet opening 32. On the first end face 41, which faces the bypass 16, the third flow channel 30 has an outlet opening 33 which corresponds with the bypass inlet 17 in this position of the rotary slide 19. In the open position of the rotary slide 19, the flow of the exhaust gas from the first and the second exhaust gas lines 12 and 13 is diverted into the bypass 16, the first and the second flow channels 24 and 25 of the rotary slide 19 being closed.

Figure 7:
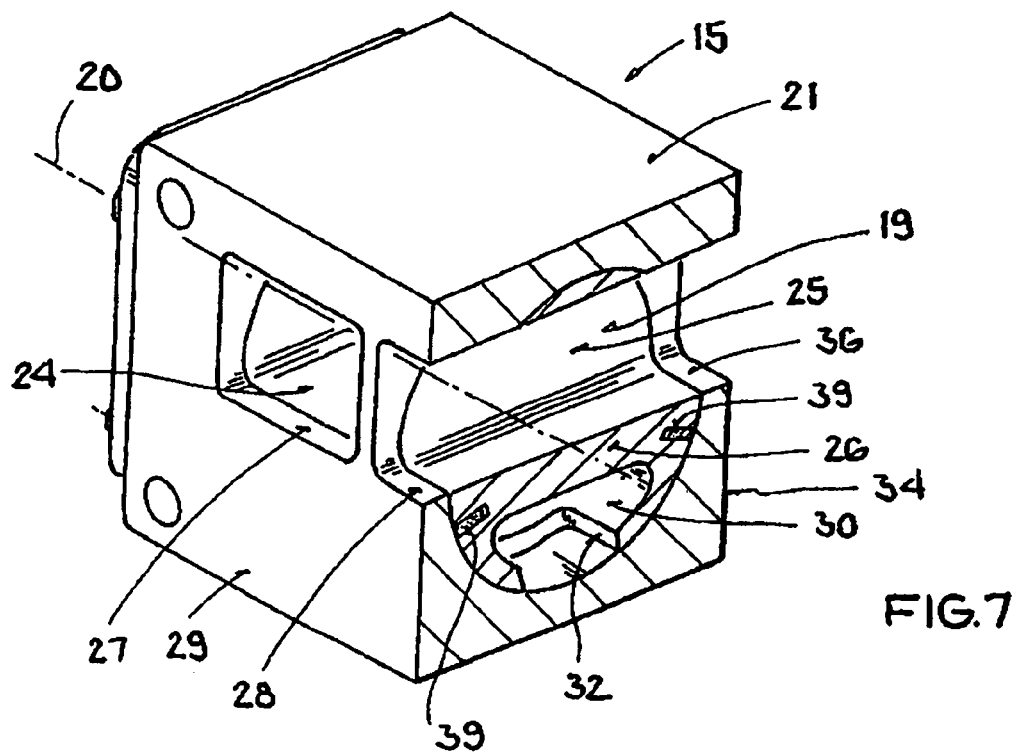
FIG. 7 shows a cross section through the flow adjusting device for the exhaust-gas turbocharger according to the invention.

For improved comprehension of the position of the flow channels 24, 25 and 30 of the rotary slide 19 with respect to one another, FIG. 7 shows a cross section through the flow adjusting device 15. The cross section extends perpendicularly with respect to the rotational axis 20 of the rotary slide 19 and opens the second flow channel 25 and the third flow channel 30. The third flow channel 30 has a circular segment-shaped cross section. The first and the second flow channels 24 and 25 lie parallel to one another and are arranged next to one another. The third flow channel 30 extends perpendicularly with respect to the two flow channels 24 and 25, a continuous wall 26 lying between the first or second flow channel 24, 25 and the third flow channel 30.

Figure 8:
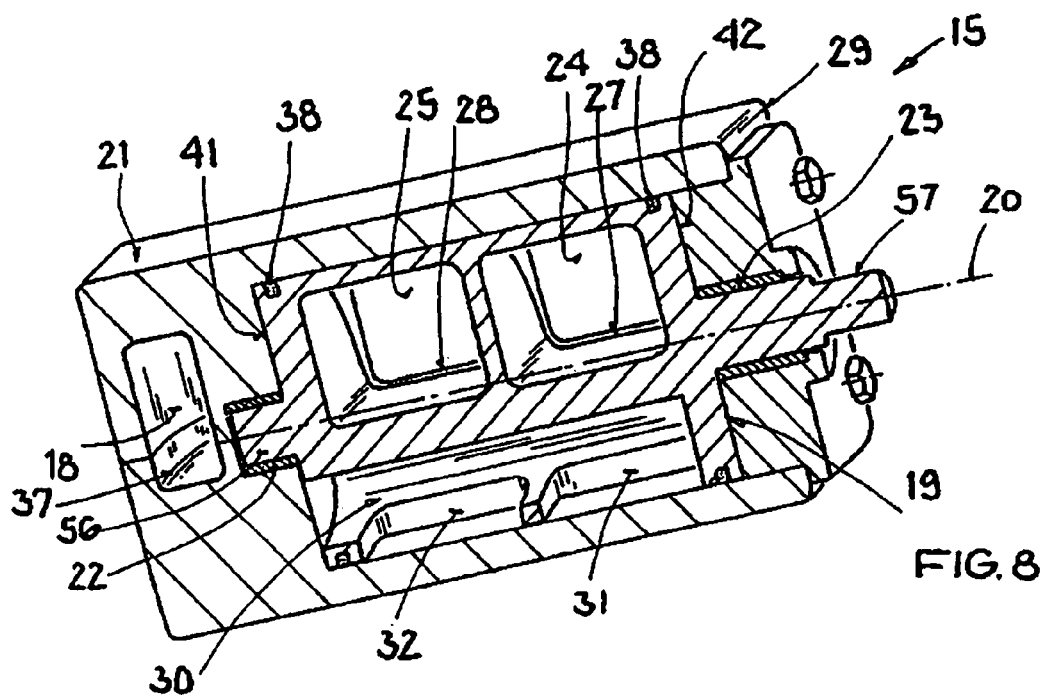
FIG. 8 is an axial sectional view of the flow adjusting device for the exhaust-gas turbocharger according to the invention.

FIG. 8 shows the flow adjusting device 15 an axial cross-sectional view. The rotary slide 19 has a first journal 56 on its first end face 41 and a second journal 57 on its second end face 42. The first journal 56 on the first end face 41 is of shorter configuration than the second journal 57 on the second end face 42 and lies completely within the rotary slide housing 21. The second journal 57 on the second end face 42 lies only partially within the rotary slide housing 21. The rotary slide 19 is mounted rotatably in the rotary slide housing 21, the first journal 56 being accommodated in the first bearing 22 and the second journal 57 being accommodated in the second journal 23. An adjusting motor (not shown in greater detail) which moves the rotary slide 19 into the desired position via the regulating and control unit 48 can be connected, for example, to the protruding end of the second journal 57. The type of bearing shown here of the first bearing 22 and the second bearing 23 represents a friction bearing. The first bearing 22 and the second bearing 23 could also be, for example, roller bearings.

The rotary slide 19 has in each case one sealing ring 38 on its circumference in the vicinity of the bearings 22 and 23. The sealing ring 38 extends in the circumferential direction and is designed in the manner of a piston ring. As shown in FIG. 7, two sealing strips 39 are provided on the circumferential surface of the rotary slide 19, which sealing strips 39 extends in the direction of the rotational axis 20. It is also possible to provide a plurality of sealing rings and sealing strips on the rotary slide 19. Flow losses as a result of leakages can be minimized by the sealing rings 38 and sealing strips 39.

In the exemplary embodiment which is shown, the flow adjusting device 15 is configured as a separate component which forms a structural unit together with the exhaust-gas turbocharger. The flow adjusting device 15 might also in principle be integrated into the turbine housing of the turbine 3.

In order to establish the open position of the rotary slide 19 starting from the closed position of the rotary slide 19, the rotary slide 19 is rotated until the two flow channels 24 and 25 no longer coincide with the rotary slide housing openings 27 and 28 or 35 and 36, but the third flow channel 30 which is integrated into the rotary slide 19 opens the rotary slide housing openings 27 and 28 via the inlet openings 31 and 32. In the open position, the exhaust gas can flow out of the first exhaust gas manifold 10 and the second exhaust gas manifold 11 via the first exhaust gas line part 52 and the third exhaust gas line part 54 into the first inlet opening 31 or into the second inlet opening 32 of the third flow channel 30 of the rotary slide 19. The exhaust gas flows further via the third flow channel 30 into the bypass line 16 and from there into the third flow passage 7 of the turbine 3. Herein the exhaust gas does not flow through the two other flow passages 5 and 6 of the turbine 3.

The closed position is set, starting from the open position of the rotary slide 19, by further rotation of the rotary slide 19 until the flow channels 24 and 25 coincide with the rotary slide housing openings 27 and 28 or 35 and 36, and the bypass inlet 17 is closed by the end face 41. In the closed position, the exhaust gas flows out of the first exhaust gas manifold 10 and out of the second exhaust gas manifold 11 via the first exhaust gas line part 52 and the third exhaust gas line part 54 into the first flow channel 24 or into the second flow channel 25 and from there further into the second exhaust gas line part 53 or into the fourth exhaust gas line part 55, and finally reaches the turbine wheel 4 of the turbine 3 via the first flow passage 5 or the second flow passage 6.

In an engine braking phase of the internal combustion engine 44, the rotary slide 19 is in its open position, with the result that the exhaust gas can flow out of the first exhaust gas manifold 10 and the second exhaust gas manifold 11 via the first exhaust gas line part 52 and the third exhaust gas line part 54 into the first inlet opening 31 or into the second inlet opening 32 of the third flow channel 30 of the rotary slide 19. The exhaust gas flows further via the third flow channel 30 into the bypass 16 and from there into the third flow passage 7 of the turbine 3. The two other flow passages 5 and 6 of the turbine 3 are therefore not flowed through by the exhaust gas.

In the exemplary embodiment of a three-flow passage turbine, the bypass ends in the third flow passage 7. In a two-flow turbine, the bypass 16 opens into one of the two flows of the turbine. In an asymmetrical turbine, the bypass 16 preferably opens into the smaller of the two turbine flows, with the result that the smaller of the two flows is charged by the exhaust gas in the engine braking phase.

Outside the braking mode of the internal combustion engine 44, the rotary slide 19 is predominantly in its closed position. Depending on the method of operation, the rotary slide can also be used for a change in the turbine loading outside the engine braking mode. It is therefore possible, as a result of the change in the position of the rotary slide valve 19 from the closed position into the open position, to change over from pulse induction, as is used in the loading of a two-flow or multiple-flow turbine, to ram induction. In ram induction, only one of the turbine flows is charged with exhaust gas; as a result, the efficiency of the internal combustion engine can be increased.

What is claimed is:

1. An exhaust-gas turbocharger for an internal combustion engine having an intake section (9) with a compressor (2) and an exhaust gas section (8) with a turbine (3) including a turbine wheel (4) and having at least a first and a second flow passage (5, 6), a flow adjusting device (15) arranged upstream of the flow passages and a bypass line (16) extending from the flow adjusting device (15) to the turbine (3), the flow adjusting device (15) including a rotary slide (19) with a rotational axis (20) and being disposed in a rotary slide housing (21), such that a connection is established or blocked between the bypass line (16) and the flow passages (5, 6) by means of the rotary slide (19), the rotary slide (19) having for this purpose, at least a first flow channel (24) and a second flow channel (25), and the rotary slide housing (21) having at least a first rotary slide housing opening (27) and a second rotary slide housing opening (28) at a side (29) remote from the turbine wheel, said first flow channel (24) and said second flow channel (25) of the rotary slide (19) extending through the rotary slide (19) transversely with respect to the rotational axis (20) thereof and the rotary slide (19) having a third flow channel (30) which extends partially through the rotary slide (19) in the direction of the rotational axis (20) and has at least two inlet openings on the slide circumference which can be brought into overlap with the rotary slide housing openings (27, 28), that is, a first inlet opening (31) and a second inlet opening (32), and which ends at an axial outlet opening (33), at least three further rotary slide housing openings being provided in the rotary slide housing (21) on the side thereof (34) which faces the turbine wheel, that is, a third rotary slide housing opening (35), a fourth rotary slide housing opening (36) and a fifth rotary slide housing opening (37) which is in communication with the axial outlet opening (33).

2. The exhaust-gas turbocharger as claimed in claim 1, wherein the first flow channel (24) and the second flow channel (25) of the rotary slide (19) penetrate the rotary slide (19) perpendicularly with respect to the rotational axis (20) of the rotary slide (19).

3. The exhaust-gas turbocharger as claimed in claim 1, wherein the rotary slide (19) has at least two circumferential spaced sealing rings (38) and at least one sealing strip (39) extending axially between the circumferential sealing rings (38).

4. The exhaust-gas turbocharger as claimed in claim 1, wherein the bypass line (16) opens downstream of the rotary slide (19) one (7) of the flows passages (5, 6, 7) of the turbine (3).

5. The exhaust-gas turbocharger as claimed in claim 1, wherein the first flow channel (24) and the second flow channel (25) are arranged next to one another and parallel to one another.

6. The exhaust-gas turbocharger as claimed in claim 1, wherein the third flow channel (30) in the rotary slide (19) is arranged transversely with respect to the first flow channel (24) or the second flow channel (25), and a continuous wall (26) of the rotary slide (19) extends between at least one of the first flow channel (24) and the second flow channel (25) and the third flow channel (30).

* * * * *